(12) United States Patent
Maekawa et al.

(10) Patent No.: US 7,818,863 B2
(45) Date of Patent: Oct. 26, 2010

(54) METHOD AND DEVICE FOR MOUNTING AN AUTOMOTIVE WINDOW GLASS

(75) Inventors: Keiichiro Maekawa, Saitama (JP); Toshihisa Shimoda, Saitama (JP); Kenji Kusumegi, Saitama (JP); Takafumi Murakoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1101 days.

(21) Appl. No.: 10/559,530

(22) PCT Filed: Jun. 3, 2004

(86) PCT No.: PCT/JP2004/008060
§ 371 (c)(1), (2), (4) Date: Aug. 7, 2006

(87) PCT Pub. No.: WO2004/108509
PCT Pub. Date: Dec. 16, 2004

(65) Prior Publication Data
US 2007/0039152 A1   Feb. 22, 2007

(30) Foreign Application Priority Data
Jun. 4, 2003   (JP) .................................. 2003-158838

(51) Int. Cl.
*B23Q 17/00* (2006.01)
*B23P 21/00* (2006.01)
*G05B 15/00* (2006.01)

(52) U.S. Cl. ............... 29/407.01; 29/407.04; 29/407.05; 29/407.09; 29/407.1; 29/720; 29/712; 29/721; 29/464; 29/709; 700/258; 700/114; 414/730

(58) Field of Classification Search ............... 29/407.01, 29/407.04, 407.05, 407.09, 407.1, 464, 709, 29/712, 720, 721; 700/114, 258; 414/730
See application file for complete search history.

(56) References Cited

U.S. PATENT DOCUMENTS 4,670,974 A * 6/1987 Antoszewski et al. ......... 29/701

(Continued)

FOREIGN PATENT DOCUMENTS

JP   2-55268 B   11/1990

(Continued)

*Primary Examiner*—Essama Omgba
(74) *Attorney, Agent, or Firm*—Arent Fox LLP (57) ABSTRACT

A window glass can be accurately and preferably mounted by correcting a displacement of a curved surface shape of the window glass in the crosswise direction even when there is a displacement of the curved surface shape of the window glass in the crosswise direction. A slit laser beam is irradiated with from slit laser beam irradiators 12c and 12d across the right and left ends of the window glass 6, the circumference of a window glass mounting opening 8, and a windshield pillar section 11; rotation adjustment of the window glass 6 is performed, based on a processed image obtained by image processing of images, which have been photographed with a CCD cameras 10c and 10d, of the slit laser beams, in such a way that clearances in the pressing direction at the right and left ends of the window glass 6 are the same as each other; and the window glass 6 is pressed onto a window glass mounting surface on the circumference of the window glass mounting opening 8 for mounting onto the surface.

4 Claims, 5 Drawing Sheets

U.S. PATENT DOCUMENTS

| | | | |
|---|---|---|---|
| 4,715,772 A | | 12/1987 | Kanayama |
| 4,789,417 A | * | 12/1988 | Komatsu et al. ............ 156/356 |
| 4,831,561 A | * | 5/1989 | Utsumi ...................... 702/150 |
| 4,852,237 A | | 8/1989 | Tradt |
| 4,885,833 A | * | 12/1989 | Umegai et al. ........... 29/407.05 |
| 4,909,869 A | * | 3/1990 | Sakamoto et al. ............. 156/64 |
| 5,046,851 A | | 9/1991 | Morgan |
| 7,322,092 B2 | * | 1/2008 | Adas et al. ................... 29/468 |
| 7,610,666 B2 | * | 11/2009 | Adas et al. ................... 29/468 |

FOREIGN PATENT DOCUMENTS

JP          7-104127 B     11/1995

* cited by examiner

METHOD AND DEVICE FOR MOUNTING AN AUTOMOTIVE WINDOW GLASS

CROSS-REFERENCE TO RELATED APPLICATION

This application is a National Stage entry of International Application No. PCT/JP2004/008060, filed Jun. 3, 2004, the entire specification claims and drawings of which are incorporated herewith by reference.

TECHNICAL FIELD

The present invention relates to a method and a device, by which, after alignment, a window glass is mounted onto a window glass mounting opening surface on a circumference of a window glass mounting opening, which is provided on a body of an automobile.

BACKGROUND ART

A method, in a process, for positioning a window glass by a robot on a window glass mounting surface on a circumference of a window glass mounting opening, which is provided on the body of an automobile, and mounting thereon, a displacement of a window glass mounted position, from a standard position is calculated based on an image photographed with a camera, then the calculated displacement from the standard position is corrected, and the window glass is automatically mounted onto the window glass mounting surface using the robot, has been disclosed in, for example, Examined Japanese Patent Publication No. H2-055268.

Incidentally, a window glass of an automobile, especially, a front one is not a flat-shaped glass, but a curved surface shaped glass which is curved in the crosswise direction (in the width direction of the body). Accordingly, some errors are caused in the shape of the curved surface of the window glass at manufacturing it by thermoforming. Thereby, for example, if there is a displacement of the curved surface shape of the window glass at the left end and the right end, a clearance between the window glass at the left end or the right end and the window glass mounting surface in the direction perpendicular to the surface of the window glass are different in size from each other, when the window glass is positioned by the robot on the window glass mounting surface on the circumference of the window glass mounting opening, and is moved to just above the window glass mounting surface.

Thus, if there is a displacement of the curved surface shape at the right end and the left end of the window glass, the right and left ends of the window glass are non-uniformly pressed onto the window glass mounting surface to cause non-uniform bonding of the window glass onto the mounting surface, when the window glass is positioned by the robot on the window glass mounting surface on the circumference of the window glass mounting opening, and is moved in the direction to the window glass mounting surface, and the window glass is pressed on the window glass mounting surface for bonding.

Though a displacement of the position of the window glass mounted position is corrected in a method according to the above-mentioned Examined Japanese Patent Publication No. H2-055268, a displacement of the curved surface shape of the window glass in the crosswise direction has not been considered in the method. Accordingly, the above method has not been able to realize a configuration by which the displacement of the curved surface shape of the window glass in the crosswise direction is corrected for mounting the window glass.

Then, an object of the present invention is to provide a method and a device for mounting an automotive window glass, by which a window glass is accurately and preferably mounted by correcting a displacement of the curved surface shape of the window glass in the crosswise direction even when there is a displacement of the curved surface shape of the window glass in the crosswise direction.

DISCLOSURE OF INVENTION

In order to achieve the above-mentioned object, a first aspect of the present invention is a method for mounting an automotive window glass by which a window glass, which is held at a window glass holding member provided at a tip of an attitude-adjustable robot arm, and which is at least curved in the crosswise direction corresponding to the width direction of a body of an automobile, is positioned on a window glass mounting opening provided on the body of the automobile, and is mounted onto a window glass mounting surface on the circumference of the window glass mounting opening, comprising the steps of: moving the window glass to just above the window glass mounting opening according to a mounting position on the window glass mounting surface by driving and controlling the robot arm; irradiating both the ends approximately at the same position as each other at least in the crosswise direction of the window glass with a slit laser beam from upward at an angle with regard to the perpendicular direction to the surface of the window glass held at the window glass holding member across the right and the left ends of the window glass, the window glass mounting surface and a surface of the body at a position which is higher than that of the window glass mounting surface outside the window glass mounting surface; photographing bent laser beams, which are formed, using the slit laser beams irradiated across the right and left ends of the window glass, the window glass mounting surface and the surface of the body, the beams being formed by clearances in the perpendicular direction to the surface of the window glass, approximately in the perpendicular direction to the surface of the window glass at the right and left ends of the window glass; calculating, at least, a difference between the clearances, in the perpendicular direction to the surface of the window glass, between the right and left ends of the window glass and the surface of the body based on a predetermined processed image generated by image processing of photographed images of the laser beams, and calculating a rotation amount in a rotation direction around the perpendicular direction to the surface of the window glass, wherein the rotation amount is required to be adjusted in such a way that the calculated difference between the clearances becomes zero; rotation adjusting the window glass held at the window glass holding member by driving and controlling the robot arm according to the rotation amount calculated; and mounting the window glass, which has been rotation adjusted, onto the window glass mounting surface by pressing the window glass onto the window glass mounting surface in the perpendicular direction to the surface of the window glass.

Moreover, a second aspect of the invention is the method for mounting an automotive window glass according to the first aspect of the invention, comprising a step of mounting the window glass onto the window glass mounting surface by calculating a moving distance, which is in the pressing direction of the window glass, and is required for appropriate pressing of the right and left ends of the window glass onto the window glass mounting surface at the mounting positions, using the clearances in the perpendicular direction to the window glass between the right and left ends of the window glass and the surface of the body, which have been calculated, and moving the window glass by driving and controlling the robot arm, based on the moving distance calculated and pressing onto the window glass mounting surface at a mounting position in the perpendicular direction to the surface of the window glass.

Furthermore, a third aspect of the invention is a device for mounting an automotive window glass by which a window glass, which is held at a tip of an attitude-adjustable robot arm, and which is at least curved in the crosswise direction corresponding to the width direction of a body of an automobile, is positioned on a window glass mounting opening provided on the body of the automobile, and is mounted onto a window glass mounting surface on the circumference of the window glass mounting opening, comprising: a robot control unit for moving the window glass to just above the window glass mounting opening according to a mounting position on the window glass mounting surface by driving and controlling the robot arm; a pair of slit laser beam irradiating units for irradiating both the ends approximately at the same position as each other at least in the crosswise direction of the window glass with a slit laser beam from upward at an angle with regard to the perpendicular direction to the surface of the window glass held at the window glass holding member across the right and the left ends of the window glass, the window glass mounting surface and a surface of the body at position which is higher than that of the window glass mounting surface outside the window glass mounting surface; a pair of photographing units for photographing bent laser beams, which are formed, using the slit laser beams irradiated across the right and left ends of the window glass, the window glass mounting surface and the surface of the body, the beams being formed by clearances in the perpendicular direction to the surface of the window glass, approximately in the perpendicular direction to the surface of the window glass at the right and left ends of the window glass; an image processing unit for generating a predetermined processed image by image processing of images of the laser beams, which have been photographed by the photographing unit; a calculating unit for calculating, at least, a difference between the clearances, in the perpendicular direction to the surface of the window glass, between the right and left ends of the window glass and the surface of the body based on the processed image generated by the image processing unit, and for calculating a rotation amount in a rotation direction around the perpendicular direction to the surface of the window glass, wherein the rotation amount is required to be adjusted in such a way that the calculated difference between the clearances becomes zero; wherein rotation adjustment of the window glass held at the window glass holding member is performed by driving and controlling the robot arm according to the rotation amount calculated, and the window glass, which has been rotation adjusted, is mounted onto the window glass mounting surface by pressing the window glass onto the window glass mounting surface in the perpendicular direction to the surface of the window glass.

Moreover, a fourth aspect of the invention is the device for mounting an automotive window glass according to the third aspect of the invention, wherein the window glass is mounted onto the window glass mounting surface by calculating a moving distance, which is in the pressing direction of the window glass, and is required for appropriate pressing of the right and left ends of the window glass onto the window glass mounting surface at the mounting positions, using the clearances in the perpendicular direction to the window glass between the right and left ends of the window glass and the surface of the body, which have been calculated by the calculating unit, and the window glass is moved by driving the robot arm under control of the robot control unit, based on the moving distance calculated and is pressed onto the window glass mounting surface at a mounting position in the perpendicular direction to the surface of the window glass.

According to the method and the device for mounting an automotive window glass of the present invention, the window glass can be accurately and preferably installed onto the window glass mounting surface on the circumference of the window glass mounting opening by the configuration in which slit laser beams are irradiated across the right and left ends of the window glass, the window glass mounting surface, and the surface of the body; at least, a difference between the clearances, in the perpendicular direction to the surface of the window glass, between the right and left ends of the window glass and the surface of the body is calculated based on a processed image obtained by image processing of photographed images of the slit laser beams; a rotation amount in the rotation direction around the perpendicular direction to the surface of the window glass is calculated in such a way that the calculated difference between the clearances becomes zero, wherein the rotation amount is required to be adjusted; rotation adjustment of the window glass held at the window glass holding member is performed by driving and controlling the robot arm according to the calculated rotation amount; and the window glass which has been rotation adjusted is pressed onto the window glass mounting surface in the perpendicular direction to the surface of the window glass.

Moreover, according to this invention, the right and left ends of the window glass can be preferably mounted onto the window glass mounting surface with a uniform pressure even when there is a displacement of the curved surface shape of the window glass in the crosswise direction by the configuration in which a moving distance, which is in the pressing direction of the window glass, and is required for appropriate pressing of the right and left ends of the window glass onto the window glass mounting surface at the mounting positions, is calculated, using the calculated clearances in the perpendicular direction to the window glass between the right and left ends of the window glass and the surface of the body; and the window glass is moved by driving and controlling the robot arm, based on the calculated moving distance, and is pressed onto the window glass mounting surface at a mounting position in the perpendicular direction to the surface of the window glass.

BEST MODE FOR CARRYING OUT THE INVENTION

Hereinafter, embodiments according to the present invention will be explained, referring to drawings.

Figure 1:
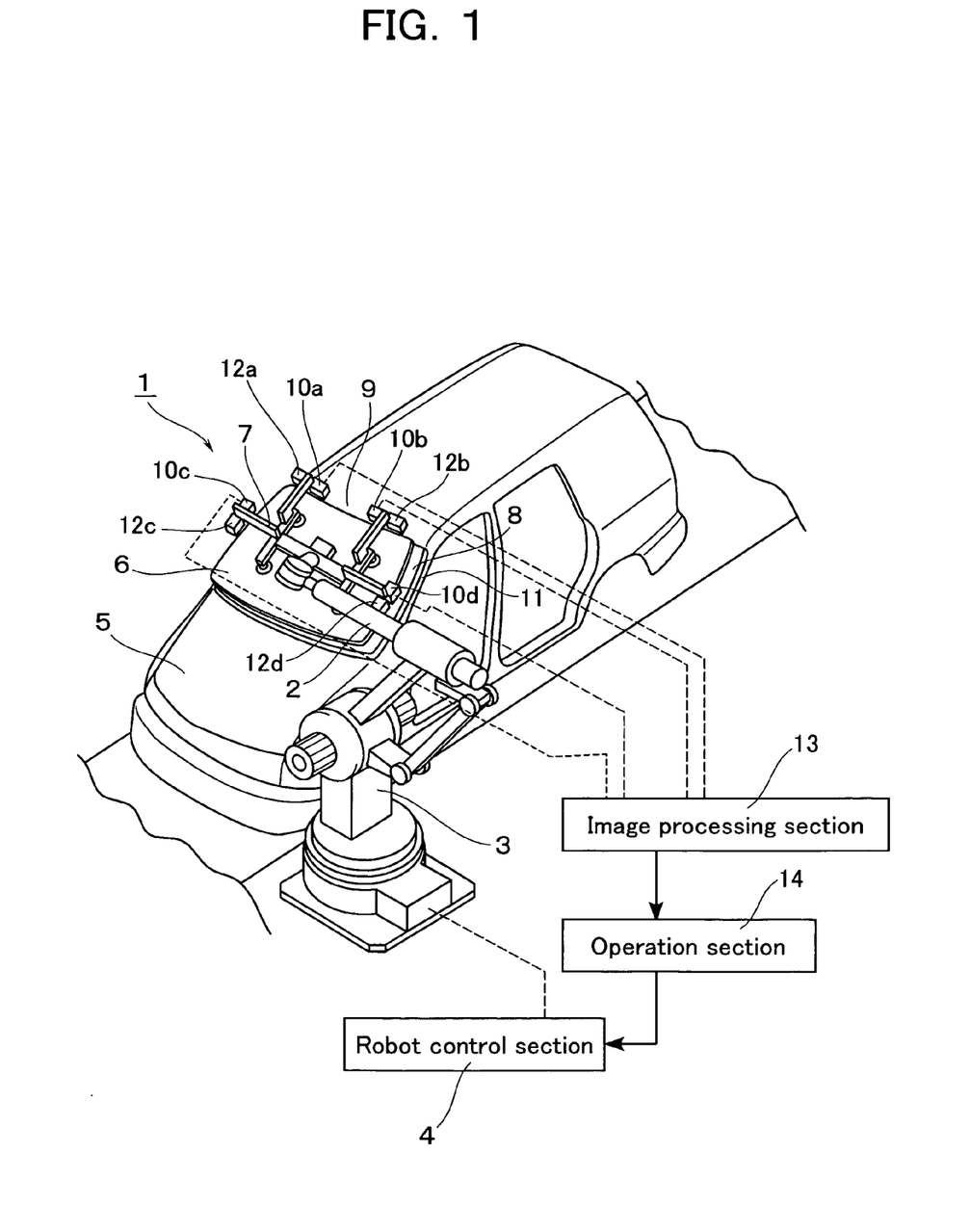
FIG. 1 is a schematic view showing a configuration of an automotive window glass mounting device according to an embodiment of this invention.

FIG. 1 is a schematic view showing a configuration of an automotive window glass mounting device according to an embodiment of this invention. A window glass mounting device 1 according to this embodiment is provided with a window glass mounting robot (hereafter, called a robot) 3 having an altitude-adjustable robot arm 2, which is driven, based on a control signal from a robot control section 4. This robot 3 is installed on a window glass mounting line.

A window glass holding machine 7 is mounted at the tip of the robot arm 2, wherein the machine 7 absorbs and holds a front window glass for a windshield (hereafter, called a window glass) 6, which is mounted on a body 5 of the automobile. The altitude of the window glass holding machine 7 can be adjusted according to the driving state of the robot arm 2.

A pair of CCD cameras 10a and 10b are installed on the upper side of the window glass holding machine 7, and a pair of CCD cameras 10c and 10d are installed on the right side, and the left side. Each of the CCD cameras 10a and 10b photographs the vicinity of the upper portion of the window glass mounting opening 8 at the side of the roof panel 9, and photographs the upper edge of the window glass 6, when the window glass 6 which is adsorbed and held at the window glass holding machine 7 is moved to just above the window glass mounting surface on the circumference of the window glass mounting opening 8 which is provided on the body 5, based on a control signal from the robot control section 4. Each of the CCD cameras 10c, 10d photograph the vicinity of the side portion of the window glass mounting opening 8 at the side of a window pillar section 11, and photographs the edge of the window glass 5 at the right and left side, respectively, when the window glass 6 which is adsorbed and held at the window glass holding machine 7 is moved to just above the window glass mounting surface on the circumference of the window glass mounting opening 8 which is provided on the body 5, based on a control signal from the robot control section 4.

The pair of CCD cameras 10a and 10b, each of which photographs the vicinity of the upper portion at the side of the roof panel 9 and the upper edge of the window glass 6, are positioned symmetric with respect to an axis (refer to a Y axis in FIG. 2) passing through the center of the window glass 6 in the up-and-down direction. On the other hand, the pair of CCD cameras 10c and 10d, which photographs the vicinity of the side portion of the window glass mounting opening 8 at the side of the windshield pillar section 11 and the edge of the window glass 6 at the right and left side respectively, are provided at the right and left edges of the window glass 6 on a line parallel to an axis (refer to an X axis in FIG. 2) passing through the center of the window glass 6 in the left and right direction. Each of the CCD cameras 10a, 10b, 10c, and 10d is installed approximately perpendicularly (in the Z-axis direction shown in FIG. 2) to the surface of the window glass 6 which is adsorbed and held at the window glass holding machine 7, and photographs the window glass from above approximately perpendicularly to the surface of the window glass 6.

Slit laser beam irradiators 12a, 12b, 12c and 12d which irradiate regions, which are photographed with the CCD camera 10a, 10b, 10c and 10d respectively with a slit-like laser beam (slit laser beam) in a slanting direction are installed in the vicinity of the CCD cameras 10a, 10b, 10c and 10d installed at the window glass holding machine 7.

Figure 3:
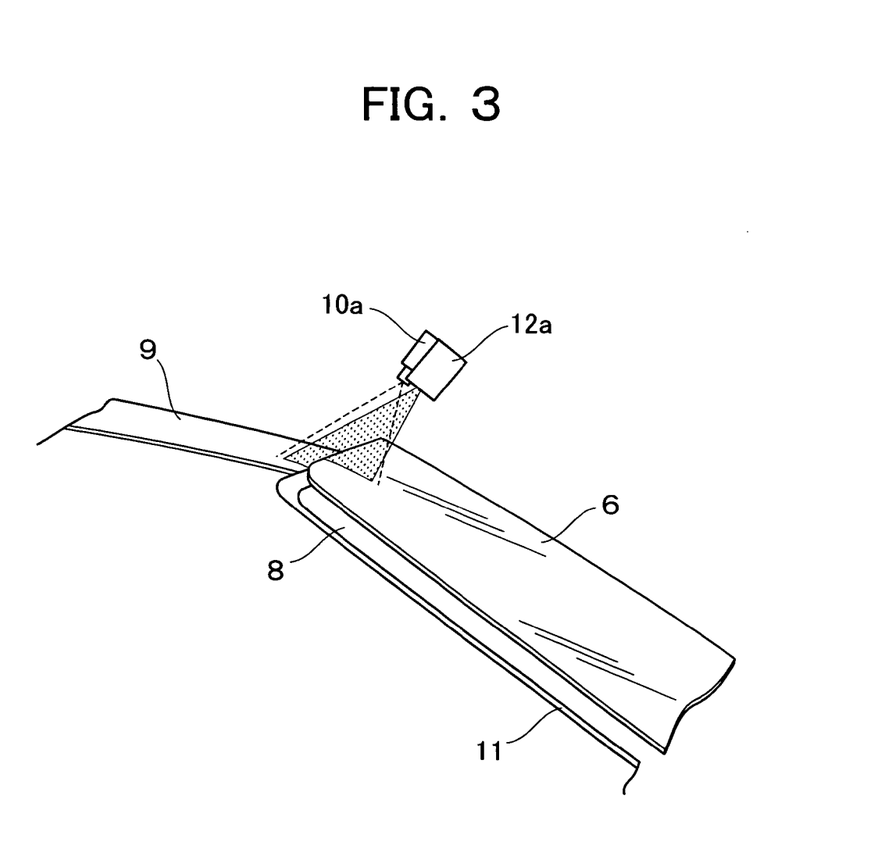
FIG. 3 is a view showing a slit laser beam irradiator for irradiating with a slit laser beam across the upper edge of the window glass and the end of a roof panel, and a CCD camera for photographing the irradiated slit laser beam.

Using each of the slit laser beam irradiators 12a and 12b which is installed in the vicinity of the CCD cameras 10a and 10b respectively, the laser beam is irradiated across the vicinity of the upper portion the window glass mounting opening 8 at the side of the roof panel 9 and the upper edge of the window glass 6, as shown in FIG. 3, when the window glass 6 which is adsorbed and held at the window glass holding machine 7 is moved to a position (just above the mounting surface on the circumference of the window glass mounting opening 8) which has been instructed beforehand by the robot control section 4 with reference to the window glass mounting opening 8 of the body 5. Here, though the CCD camera 10a and the slit laser beam irradiator 12a are shown in FIG. 3, the same holds for the CCD camera 10b and the slit laser beam irradiator 12b.

The slit laser beam irradiators 12a and 12b are provided inclined slightly inward to each other in the crosswise direction (in the X-axis direction shown in FIG. 2) of the window glass 6.

Figure 4:
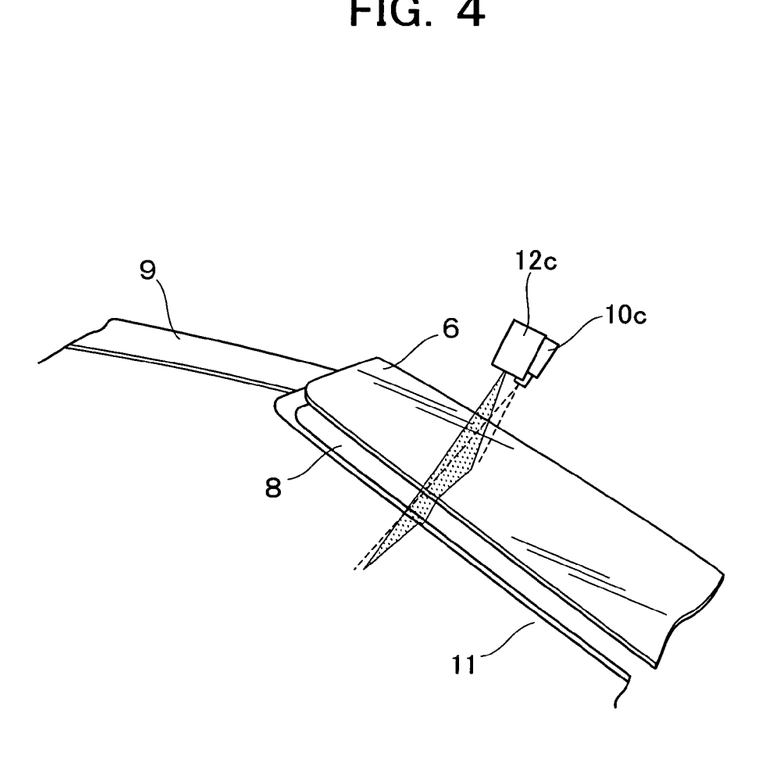
FIG. 4 is a view showing a slit laser beam irradiator for irradiating with a slit laser beam across the left edge of the window glass and a windshield pillar section, and a CCD camera for photographing the irradiated slit laser beam.

On the other hand, the laser beam is irradiated across the vicinity of the side portion at the side of the windshield pillar section 11 and the edge of the window glass 6 at the right and left sides, as shown in FIG. 4, using the slit laser beam irradiators 12c and 12d installed in the vicinity of the CCD cameras 10c and 10d. In the up-and-down direction (in the Y-axis direction shown in FIG. 2) of the window glass 6, the slit laser beam irradiators 12c and 12d are provided inclined slightly downward in the direction perpendicular to the surface of the window glass 6. Here, though the CCD camera 10c and the slit laser beam irradiator 12c are shown in FIG. 4, the same holds for the CCD camera 10d and the slit laser beam irradiator 12d.

Each of the CCD cameras 10a, 10b, 10c and 10d photographs an image of a slit-like laser beam, which is irradiated with from the slit laser beam irradiators 12a, 12b, 12c and 12d respectively and the photographed image signal is inputted to an image processing section 13 to obtain the photographed image. An operation section 14 calculates corrections for displacements of the window glass 6 from the mounting surface on the circumference of the window glass mounting opening 8, based on image information input from the image processing section 13 (the details will be described later).

The robot control section 4 outputs a control signal to the robot arm 2, based on information on the correction input from the operation section 14, to drive the robot arm 2 in such a way that the window glass 6 is mounted onto the mounting surface of the window glass mounting opening 8 at an appropriate position.

Subsequently, a method for mounting the window glass 6 according to this embodiment will be explained.

By driving the robot arm 2 of the robot 3, under control of the robot control section 4, for the body 5 conveyed to a predetermined position on the window glass mounting line, the window glass 6 which is adsorbed and held at the window glass holding machine 7 at the tip of the robot arm 2 is moved to a mounting position which has been instructed beforehand for the mounting surface on the circumference of the window glass mounting opening 8 of the body 5. Then, moving operation of the window glass 6 is temporarily stopped just above (several millimeters short of) the mounting surface on the circumference of the window glass mounting opening 8.

Subsequently, laser beams are irradiated with downward from the slit laser beam irradiators 12a, 12b, 12c, and 12d at an angle with regard to the direction perpendicular to the circumference of the window glass mounting opening 8, as shown in FIG. 3 and FIG. 4. Here, though the slit laser beam irradiators 12a and 12c are shown in FIG. 3 and FIG. 4, the same holds for the slit laser beam irradiators 12b and 12d.

Figure 2:
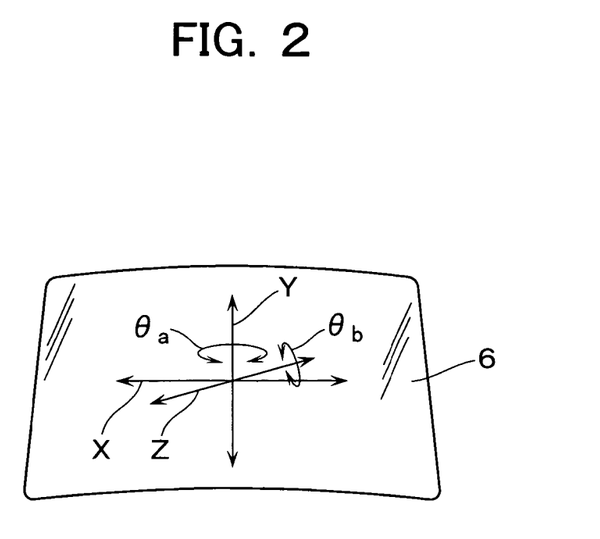
FIG. 2 is a view showing an X-axis direction, a Y-axis direction, and a Z-axis direction of the window glass in a mounting state.

As the slit laser beam irradiators 12a and 12b are inclined in the X-axis direction (in the crosswise direction of the window glass 6), the emitted slit laser beams are irradiated across the vicinity of the upper portion of the circumference of the window glass mounting opening 8 at the side of the roof panel 9 and the edge of the window glass 6 at the side of the upper surface in the up-and-down direction (in the Y-axis direction in FIG. 2). As the mounting surface on the circumference of the window glass mounting opening 8 is located below the surface of the roof panel 9, and the window glass 6 is located above the mounting surface on the circumference of the window glass mounting opening 8 in this case, the slit laser beam is not irradiated with as a straight line, but is bent and projected in the crosswise direction (in the X-axis direction in FIG. 2).

Figure 5A:
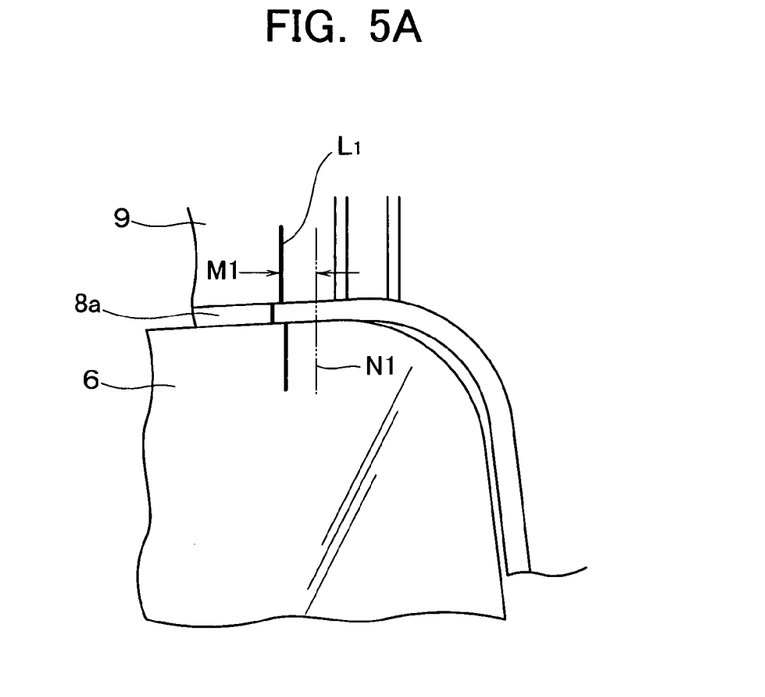
FIG. 5(A) is a view showing a projected line by a slit laser beam which is irradiated across the upper end of the window glass, and the roof panel.

That is, the projected line L1 by the slit laser beam which is irradiated across the upper end (the right side of the glass in the drawing) of the window glass 6, the mounting surface 8a on the circumference of the window glass mounting opening 8, and the roof panel 9 in the up-and-down direction (in the Y-axis direction in FIG. 2), is bent on the mounting surface 8a on the circumference of the window glass mounting opening 8, which is the lowest, as shown in FIG. 5(A).

On the other hand, as the slit laser beam irradiators 12c and 12d are inclined in the Y-axis direction (the up-and-down direction of the window glass 6), the emitted slit laser beams are irradiated across the vicinity of the side portion on the circumference of the window glass mounting opening 8 at the side of the windshield pillar section 11 and the edge of the window glass 6 at the side face in the crosswise direction (in the X-axis direction in FIG. 2). As the mounting surface on the circumference of the window glass mounting opening 8 is located below the surface of the windshield pillar section 11, and the window glass 6 is located above the mounting surface on the circumference of the window glass mounting opening 8 in this case, the slit laser beam is not irradiated with as a straight line, but is bent and projected in the up-and-down direction (in the Y-axis direction in FIG. 2).

Figure 5B:
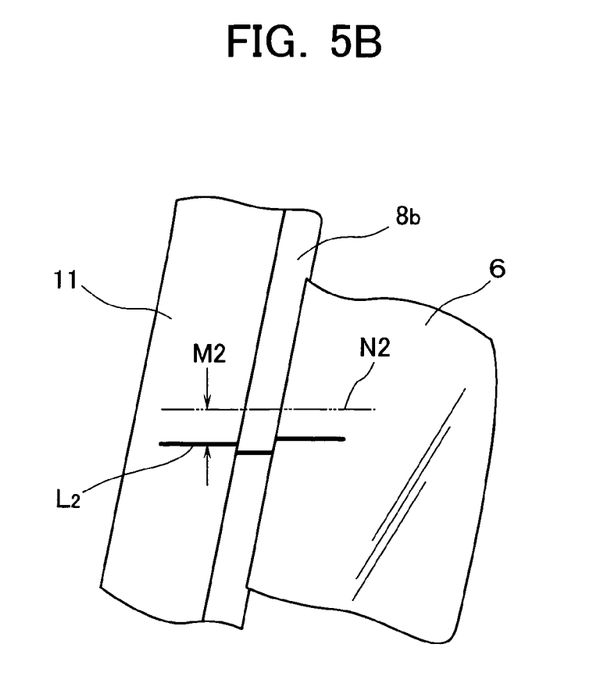
FIG. 5(B) is a view showing a projected line by a slit laser beam which is irradiated across the left end of the window glass, and the windshield pillar section.

That is, the projected line L2 by the slit laser beam, which is irradiated across the ends of the window glass 6 at the right side and the left side (the end at the left side of the glass in the drawing), the mounting surface 8b on the circumference of the window glass mounting opening 8, and the windshield pillar section 11, is bent on the mounting surface 8b on the circumference of the window glass mounting opening 8, as shown in FIG. 5(B).

Figure 6:
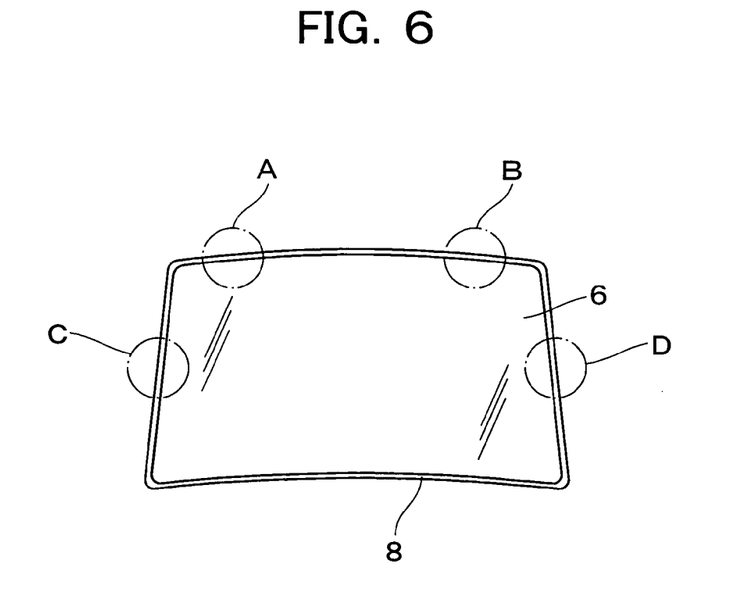
FIG. 6 is a view showing photographed regions on the window glass mounted on the circumference of a window glass mounting opening, wherein each of the CCD cameras photographs the photographed regions, respectively.

Then, each slit laser beam, which is irradiated with from each of the slit laser beam irradiators 12a, 12b, 12c and 12d is photographed with each of the CCD cameras 10a, 10b, 10c and 10d provided in close vicinity to the slit laser beam irradiators 12a, 12b, 12c and 12d respectively. That is, as shown in FIG. 6, the CCD camera 10a photographs a region A; the CCD camera 10b photographs a region B; the CCD camera 10c photographs a region C; and the CCD camera 10d photographs a region D in the window glass 6 and the mounting surface on the circumference of the window glass mounting opening 8.

Images (images shown in FIG. 5(A) and FIG. 5(B)) of the projected light beams caused by the slit laser beams are inputted to the image processing section 13, wherein the images are photographed with the CCD cameras 10a, 10b, 10c, and 10d.

The image processing section 13 can calculate a position (Z=a×M1) of the surface of the window glass 6 or that of the roof panel 9 in the Z-axis direction (in the direction perpendicular to the surface of the window glass 6) with regard to the total length of the bent and projected line L1 shown in FIG. 5(A) by multiplying a predetermined coefficient a by a distance M1, wherein the distance M1 is a distance in the X-axis direction between the projected line L1 and a standard line N1 drawn in parallel with the projected line L1. Moreover, the image processing section 13 can calculate a position (Z=b× M2) of the surface of the window glass 6 or that of the windshield pillar section 11 in the Z-axis direction (in the direction perpendicular to the surface of the window glass 6) with regard to the total length of the bent and projected line L2 shown in FIG. 5(B) by multiplying a predetermined coefficient b by a distance M2, wherein the distance M2 is a distance in the Y-axis direction between the projected line L2 and a standard line N2 drawn in parallel with the projected line L2.

Figure 7A:
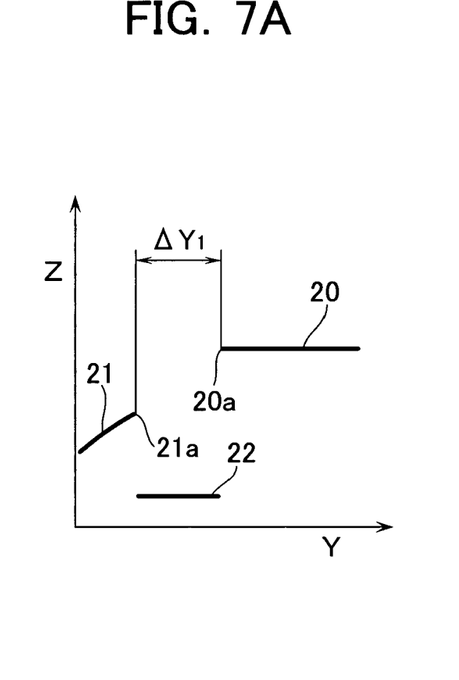
FIGS. 7(A) and 7(B) are views showing a processed image obtained by image processing of a projected line caused by a slit laser beam which is irradiated across the upper edge of the window glass and the end of the roof panel window glass.
Figure 7B:
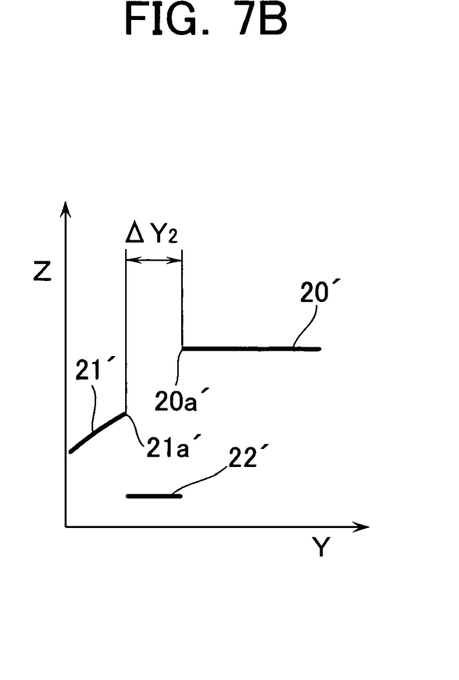
Figure 8A:
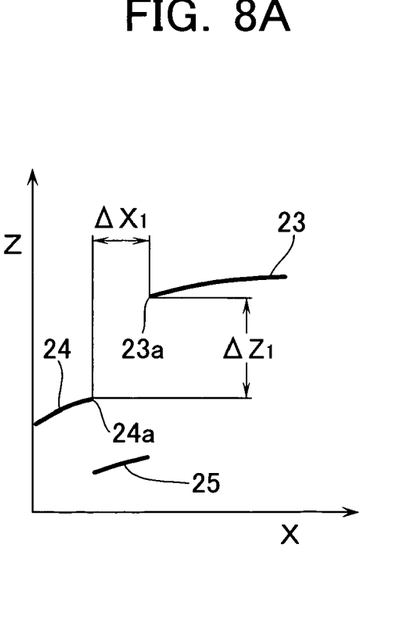
FIGS. 8(A) and 8(B) are views showing a processed image obtained by image processing of the projected line caused by the slit laser beam which is irradiated across the right end of the window glass and the windshield pillar section window glass
Figure 8B:
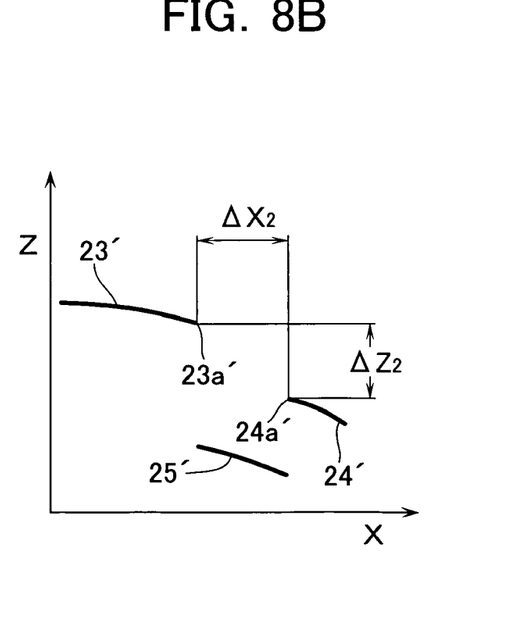

The image processing section 13 generates processed images shown in FIGS. 7(A) and, 7(B) and FIGS. 8(A), 8(B) by image processing of the bent and projected line L1 and L2 shown in FIGS. 5(A) and 5(B), based on the above-mentioned calculation results. FIGS. 7(A), 7(B) are processed images obtained by processing the images (the processed image in FIG. 7(B) is corresponding to the image in FIG. 5(A)) photographed with the CCD cameras 10a and 10b. FIGS. 8(A) and 8(B) are processed images obtained by processing the image (the processed image in FIG. 8(A) is corresponding to the image in FIG. 5(B)) photographed with the CCD cameras 10c and 10d.

In the processed images shown in FIGS. 7(A) and 7(B), numerals 20 and 20' denote lines representing positions (height) of the surface of the window glass 6 in the pressing direction (in the Z-axis direction in FIG. 2), numerals 20a and 20a' denote the upper end of the window glass 6, numerals 21 and 21' denote lines representing positions of the surface of the roof panel 9, numerals 21a and 21a' denote the end of the roof panel 9, and numerals 22 and 22' denote lines representing the mounting surface 8a on the circumstance of the window glass mounting opening 8.

ΔY1 and ΔY2 represent clearances between the upper end 20a and 20a' of the window glass 6 and the end 21a and 21a' of the roof panel 9 in the up-and-down direction (in the Y-axis direction in FIG. 2).

On the other hand, in the processed image shown in FIGS. 8(A) and 8(B), numerals 23 and 23' denote lines representing positions (height) of the surface of the window glass 6 in the pressing direction (in the Z-axis direction in FIG. 2), numerals 23a and 23a' denote the right and left ends of the window glass 6, numerals 24 and 24' denote lines representing positions of the surface of the windshield pillar section 11, numerals 24a and 24a' denote the end of the windshield pillar section 11, and numerals 25 and 25' denote lines representing the mounting surface 8b on the circumstance of the window glass mounting opening 8.

ΔX1 and ΔX2 represent clearances between the right and left end 23a and 23a' of the window glass 6 and the end 24a and 24a' of the windshield pillar section 11 in the crosswise direction (in the X-axis direction in FIG. 2) respectively. ΔZ1 and ΔZ2 represent clearances between the right end 23a and 23a' of the window glass 6 and the end 24a and 24a' of the windshield pillar section 11 in the pressing direction (in the Z-axis direction in FIG. 2) respectively.

Then, the operation section 14 calculates a difference between the clearance ΔY1 and the clearance ΔY2 shown in FIGS. 7(A) and FIG. 7(B) (ΔY1>ΔY2 in FIG. 7(A) and FIG. 7(B)) using the processed images obtained in the image processing section 13. The robot control section 4 outputs a control signal to the robot arm 2 of the robot 3 in such a way that the difference, which is inputted from the operation section 14, between the clearance ΔY1 and the clearance ΔY2 becomes 0 (ΔY1–ΔY2=0), and, under a state in which the window glass 6 is stopped just above (several millimeters short of) the mounting surface on the circumference of the window glass mounting opening 8, the window glass 6 is rotated around the Z axis (in the direction perpendicular to the surface of the window glass 6) through the center of the window glass 6 in the Z axis direction (in the THETA-b direction)(right-handed rotation in this embodiment) to perform fine adjustment of the displacement of the window glass 6 around the Z axis.

Subsequently, a control signal is outputted from the operation section 14 to the robot arm 2 of the robot 3 in such a way that the above clearances ΔY1 and ΔY2 become a predetermined value, and fine adjustment of the displacement of the window glass 6 in the Y-axis direction (up-and-down direction) is executed.

Then, the operation section 14 calculates a difference between the clearance ΔX1 and the clearance ΔX2 shown in FIG. 8(A) and FIG. 8(B) (ΔX1<ΔX2 in FIG. 8(A) and FIG. 8(B)) using the processed images obtained in the image processing section 13. The robot control section 4 outputs a control signal to the robot arm 2 of the robot 3 in such a way that the difference, which is inputted from the operation section 14, between the clearance ΔX1 and the clearance ΔX2 becomes 0 (ΔX1–ΔX2=0), and, under a state in which the window glass 6 is stopped just above (several millimeters short of) the mounting surface on the circumference of the window glass mounting opening 8, the window glass 6 is rotated around the Y axis (in the up-and-down direction to the surface of the window glass 6) through the center of the window glass 6 in the Y axis direction (in THETA-a direction) (left-handed rotation in this embodiment) to perform fine adjustment of the displacement of the window glass 6 around the Y axis.

Then, the operation section 14 calculates a difference between the clearance ΔZ1 and the clearance ΔZ2 shown in FIG. 8(A) and FIG. 8(B) (ΔZ1>ΔZ2 in FIG. 8(A) and FIG. 8(B)) using the processed images obtained in the image processing section 13. The robot control section 4 outputs a control signal, by which a moving distance of the window glass 6 is given in such a way that the difference, which is inputted from the operation section 14, between the clearance ΔZ1 and the clearance ΔZ2 becomes 0 (ΔZ1–ΔZ2=0), to the robot arm 2 of the robot 3, and, under a state in which the window glass 6 is stopped just above (several millimeters short of) the mounting surface on the circumference of the window glass mounting opening 8, the window glass 6 is moved in the ΔZ1 direction by the above-mentioned moving distance to perform fine adjustment of the moving distance in such a way that the clearance ΔZ1 and ΔZ2, in the Z-axis direction (in the direction perpendicular to the surface of the window glass 6), at the right and left ends of the window glass 6 become the same as each other.

Then, when correction of the displacements of the window glass 6, including displacements in the Z-axis direction at both of the right end and the left one of the window glass 6, from the mounting surface on the circumference of the window glass mounting opening 8 is completed as described above, the robot arm 2 is driven under a state, in which the above attitude is maintained, to move the window glass 6 by a predetermined amount in the Z-axis direction (in the pressing direction of the window glass 6), and to press the glass 6 onto the mounting surface on the circumference of the window glass mounting opening 8. Thereby, the circumference of the window glass 6 can be installed onto the window glass mounting surface by bonding with a uniformly applied pressure.

According to the present embodiment, a displacement in the pressing direction (in the Z-axis direction) at the right end or the left end of the window glass 6 can be detected and corrected as described above even when there is an error in the shape of the curved surface of the window glass 6. Accordingly, a window glass is accurately and preferably installed onto the window glass mounting surface on the circumference of the window glass mounting opening 8 of each of the bodies 5 for which the window glass 6 is mounted on a window glass mounting line.

Here, though the above-mentioned embodiment has had a configuration in which a displacement of the window glass around the X axis is not corrected when the displacement around the X axis is equal to or smaller than a predetermined value, the correction of the displacement around the X axis can be performed by providing CCD cameras and slit laser beam irradiators at positions, at which the lower end of the window glass can be photographed, in a similar manner as that of the above correction of the displacement around the Y axis or the Z axis, for example, when the shape of the window glass is required to be changed for model changes, and correction of the displacement around the X axis is required.

Moreover, the present invention can be similarly applied even to a case in which a rear windshield is mounted, though a case in which a windshield is mounted at the front side has been explained in the above-mentioned embodiment.

The invention claimed is:

1. A method for mounting an automotive window glass by which a window glass, which is held by a window glass holding member provided at a free end of an altitude-adjustable robot arm, and which is at least curved in a crosswise direction corresponding to a width direction of a body of an automobile, is positioned on a window glass mounting opening provided on the automobile body, and is mounted onto a window glass mounting surface on a circumference of the window glass mounting opening, comprising the steps of:

moving the window glass to a position located above the window glass mounting opening according to a mounting position on the window glass mounting surface by driving and controlling the robot arm;

irradiating right and left ends of the window glass approximately at a same position as each other at least in the crosswise direction of the window glass with at least one slit laser beam irradiated downward from an upward position at an angle with regard to a perpendicular direction relative to a surface of the window glass held by the window glass holding member across the right and the left ends of the window glass, the window glass mounting surface and a surface of the automobile body at a position which is higher than that of the window glass mounting surface outside the window glass mounting surface;

photographing bent laser beams, which are formed, using the at least one slit laser beam irradiated across the right and left ends of the window glass, the window glass mounting surface and the surface of the automobile body, the bent laser beams being formed by clearances in the perpendicular direction relative to the surface of the window glass, the clearances being located between the automobile body and the window glass;

calculating, at least, a difference between the clearances, in the perpendicular direction relative to the surface of the window glass, between the right and left ends of the window glass and the surface of the automobile body based on a predetermined processed image generated by image processing of photographed images of the laser beams, and calculating a rotation amount in a rotation direction around the perpendicular direction relative to the surface of the window glass, wherein the rotation amount is required to be adjusted in such a way that the calculated difference between the clearances becomes zero;

rotation adjusting the window glass held by the window glass holding member by driving and controlling the robot arm according to the calculated rotation amount; and mounting the window glass, which has been rotation adjusted, onto the window glass mounting surface by pressing the window glass onto the window glass mounting surface in the perpendicular direction to the surface of the window glass.

2. The method for mounting an automotive window glass according to claim 1, comprising a further step of mounting the window glass onto the window glass mounting surface by calculating a moving distance, which is in a pressing direction of the window glass, and is required for pressing the right and left ends of the window glass onto the window glass mounting surface at corresponding mounting positions, using the clearances in the perpendicular direction relative to the window glass between the right and left ends of the window glass and the surface of the automobile body, which have been calculated, and moving the window glass by driving and controlling the robot arm, based on the calculated moving distance, and pressing the window glass in the perpendicular direction relative to the surface of the window glass onto the window glass mounting surface at the corresponding mounting positions.

3. A device for mounting an automotive window glass by which a window glass, which is held at a free end of an altitude-adjustable robot arm, and which is at least curved in a crosswise direction corresponding to a width direction of a body of an automobile, is positioned on a window glass mounting opening provided on the automobile body, and is mounted onto a window glass mounting surface on a circumference of the window glass mounting opening, comprising:

a robot control unit for moving the window glass to a position located above the window glass mounting opening according to a mounting position on the window glass mounting surface by driving and controlling the robot arm;

a pair of slit laser beam irradiating units for irradiating right and left ends of the window glass approximately at a same position as each other at least in the crosswise direction of the window glass with at least one slit laser beam irradiated downward from an upward position at an angle with regard to a perpendicular direction relative to a surface of the window glass held by the window glass holding member across the right and the left ends of the window glass, the window glass mounting surface and a surface of the automobile body at a position which is higher than that of the window glass mounting surface outside the window glass mounting surface;

a pair of photographing units for photographing bent laser beams, which are formed, using the at least one slit laser beam irradiated across the right and left ends of the window glass, the window glass mounting surface and the surface of the body, the beams being formed by clearances in the perpendicular direction relative to the surface of the window glass, the clearances being located between the automobile body and the window glass;

an image processing unit for generating a predetermined processed image by image processing of images of the bent laser beams, which have been photographed by the photographing unit;

a calculating unit for calculating, at least, a difference between the clearances, in the perpendicular direction relative to the surface of the window glass, between the right and left ends of the window glass and the surface of the automobile body based on the processed image generated by the image processing unit, and for calculating a rotation amount in a rotation direction around the perpendicular direction relative to the surface of the window glass, wherein the rotation amount is required to be adjusted in such a way that a calculated difference between the clearances becomes zero;

wherein rotation adjustment of the window glass held by the window glass holding member is performed by driving and controlling the robot arm according to the calculated rotation amount, and the window glass, which has been rotation adjusted, is mounted onto the window glass mounting surface by pressing the window glass in the perpendicular direction relative to the surface of the window glass onto the window glass mounting surface.

4. The device for mounting an automotive window glass according to claim 3, wherein the window glass is mounted onto the window glass mounting surface by calculating a moving distance, which is in a pressing direction of the window glass, and is required for pressing of the right and left ends of the window glass onto the window glass mounting surface at corresponding mounting positions, using the clearances in the perpendicular direction relative to the window glass between the right and left ends of the window glass and the surface of the automobile body, which have been calculated by the calculating unit, and the window glass is moved by driving the robot arm under control of the robot control unit, based on the calculated moving distance and is pressed in the perpendicular direction relative to the surface of the window glass onto the window glass mounting surface at the corresponding mounting positions.

* * * * *